United States Patent
Reed et al.

(10) Patent No.: US 10,254,392 B2
(45) Date of Patent: Apr. 9, 2019

(54) REVERSE-EPHEMERIS METHOD FOR DETERMINING POSITION, ATTITUDE, AND TIME

(71) Applicant: The United States of America as represented by the Secretary of the Navy, Washington, DC (US)

(72) Inventors: Phillippe L. W. Reed, Charleston, SC (US); Michael S. McBeth, Williamsburg, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 640 days.

(21) Appl. No.: 14/848,626

(22) Filed: Sep. 9, 2015

(65) Prior Publication Data

US 2017/0067990 A1 Mar. 9, 2017

(51) Int. Cl.
| | |
|---|---|
| *G01S 13/42* | (2006.01) |
| *G01S 13/58* | (2006.01) |
| *G01S 17/50* | (2006.01) |
| *G01S 17/06* | (2006.01) |
| *G01S 7/48* | (2006.01) |
| *G01S 13/06* | (2006.01) |

(52) U.S. Cl.
CPC .......... *G01S 13/582* (2013.01); *G01S 7/4808* (2013.01); *G01S 13/06* (2013.01); *G01S 13/42* (2013.01); *G01S 13/588* (2013.01); *G01S 17/06* (2013.01); *G01S 17/50* (2013.01)

(58) Field of Classification Search
CPC ........ G01S 13/42; G01S 17/50; G01S 13/588; G01S 17/42; G01S 13/582; G01S 7/4808; G01S 17/06; G01S 13/06
See application file for complete search history.

(56) References Cited

U.S. PATENT DOCUMENTS

| | | | |
|---|---|---|---|
| 2,407,467 A | 9/1946 | Barry | |
| 2,471,686 A | 5/1949 | Hiltner | |
| 3,047,863 A | 7/1962 | Bolie | |
| 3,172,108 A | 3/1965 | McClure | |
| 3,191,176 A | 6/1965 | Guier | |
| 3,214,575 A | 10/1965 | Seliger et al. | |
| 3,384,891 A | 5/1968 | Anderson | |
| 3,402,470 A * | 9/1968 | Hart ........................ | B64G 3/00 33/228 |
| 3,571,567 A | 3/1971 | Eckermann | |
| 3,763,492 A | 10/1973 | Easton | |
| 3,769,710 A | 11/1973 | Reister | |

(Continued)

OTHER PUBLICATIONS

U.S. Appl. No. 12/293,186, filed May 22, 2007, Qinetiq Limited.

*Primary Examiner* — Matthew M Barker
(74) *Attorney, Agent, or Firm* — SPAWAR Systems Center Pacific; Kyle Eppele; Susanna J Torke (57) ABSTRACT

A method to calculate position of a platform using a detection and ranging system coupled to the platform to transmit a signal to space object having a known ephemeris. The detection and ranging system receives the reflected signal from the space object. Taking the range of the platform from the space object using a time delay between transmission of the signal and receipt of the reflected signal and the range-rate using a Doppler frequency shift between the transmission of the signal and the receipt of the reflected signal makes it possible to calculate a position fix of the platform using the determined range, the determined range-rate, an altitude of the platform, and the known ephemeris of the space object.

6 Claims, 4 Drawing Sheets

(56) References Cited

U.S. PATENT DOCUMENTS

| | | | |
|---|---|---|---|
| 3,789,409 A | 1/1974 | Easton | |
| 4,359,733 A | 11/1982 | O'Neill | |
| 5,159,401 A | 10/1992 | Decker, Jr. | |
| 5,359,521 A | 10/1994 | Kyrtsos et al. | |
| 5,815,250 A | 9/1998 | Thomson et al. | |
| 5,828,336 A | 10/1998 | Yunck et al. | |
| 5,831,574 A | 11/1998 | Krasner | |
| 6,072,430 A | 6/2000 | Wyrwas et al. | |
| 6,078,284 A | 6/2000 | Levanon | |
| 6,081,229 A | 6/2000 | Soliman | |
| 6,340,947 B1 | 1/2002 | Chang et al. | |
| 6,463,366 B2 * | 10/2002 | Kinashi | G01C 21/24 342/357.36 |
| 6,480,788 B2 | 11/2002 | Kilfeather et al. | |
| 6,725,158 B1 | 4/2004 | Sullivan et al. | |
| 7,197,829 B2 | 4/2007 | Acres | |
| 7,342,651 B1 | 3/2008 | Woolfson | |
| 7,551,121 B1 | 6/2009 | O'Connell et al. | |
| 7,574,168 B2 | 8/2009 | Twitchell, Jr. et al. | |
| 7,783,246 B2 | 8/2010 | Twitchell, Jr. et al. | |
| 8,207,890 B2 | 6/2012 | Venkatraman et al. | |
| 8,538,682 B1 | 9/2013 | Vankatraman et al. | |
| 8,597,025 B2 | 12/2013 | Belenkii et al. | |
| 8,963,764 B1 * | 2/2015 | Gray | G01S 5/0247 342/147 |
| 9,459,344 B1 * | 10/2016 | Gray | G01S 13/88 |
| 2003/0236621 A1 | 12/2003 | Sirola et al. | |
| 2009/0098903 A1 | 4/2009 | Donaldson et al. | |
| 2009/0177398 A1 | 7/2009 | Belenkii et al. | |
| 2012/0235861 A1 | 9/2012 | Venkatraman et al. | |
| 2013/0325316 A1 | 12/2013 | Vos et al. | |
| 2014/0022128 A1 | 1/2014 | Smith | |

* cited by examiner

REVERSE-EPHEMERIS METHOD FOR DETERMINING POSITION, ATTITUDE, AND TIME

FEDERALLY-SPONSORED RESEARCH AND DEVELOPMENT

The Reverse-Ephemeris Method for Determining Position, Attitude, and Time is assigned to the United States Government and is available for licensing for commercial purposes. Licensing and technical inquiries may be directed to the Office of Research and Technical Applications, Space and Naval Warfare Systems Center, Code 51000-CTO, N. Charleston, S.C., 29419; voice (843) 218-4000; email T2@spawar.navy.mil. Reference Navy Case Number 103675.

BACKGROUND

The most widespread system which combines positioning and timing are global navigation satellite systems (GNSS), including the Global Positioning System (GPS). Many Navy systems rely on GPS-based position, navigation, and timing (PNT) data. However, reliance on GPS makes these systems potentially vulnerable to jamming, interference, or spoofing. There is a need for GPS-independent PNT solutions. Radars, telescopes, and Lidar, Ladar, and Laser rangefinders have previously been used to determine space objects' position and velocity, and their orbital parameters over time (ephemeris).

DETAILED DESCRIPTION OF SOME EMBODIMENTS

Reference in the specification to "one embodiment" or to "an embodiment" means that a particular element, feature, structure, or characteristic described in connection with the embodiments is included in at least one embodiment. The appearances of the phrases "in one embodiment," "in some embodiments," and "in other embodiments" in various places in the specification are not necessarily all referring to the same embodiment or the same set of embodiments.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

Detection and ranging systems such as Radar, Lidar, Ladar and Laser range-finders can often measure the range and range-rate of space objects. The range and range-rate measurements are most often inferred from the time delay and the Doppler frequency shift in the signal, respectively. Any of these detection and ranging systems can be mounted on gimbals or other devices capable of measuring their azimuth and elevation (or other reference angles) when pointed at the space object, and the rate at which they change angles to track space objects. Alternatively, they can consist of multiple antennas designed for interferometry to determine the angles of the signal's arrival. In the absence of some of these measurements, for instance range and range-rate, other methods can be used to determine space object position and velocity using multiple measurements at more than one instant in time. For example, the six measurements of range, range-rate, two angles, and two angle-rates at a single instance in time (or a sufficiently short time window) are sufficient to calculate the six total components of the position and velocity of the space object at that instant. Further, the detection and ranging systems can use multiple measurements in time to refine the orbit to better predict space object position and velocity (ephemeris) in the future.

There are many other types of positioning systems, though none are as common today as GNSS. The terrestrial LORAN radio navigation system was used until the advent of GNSS, but had limited range, precluding use to within about 1500 miles of a terrestrial station. Its better accuracy and global usefulness make the invention disclosed herein more appealing than LORAN.

Other systems, such as TRANSIT, use the Doppler shift in transmitted frequencies from a space object to a ground receiver to calculate the position of the receiver. Conversely, similar systems can use the shift in frequencies transmitted from a ground transmitter as seen at the space object. In either case, these systems require a long time before determining a fix (on the order of a couple minutes or more), whereas the system disclosed herein can process a solution as soon as a single radar or lidar pulse is returned from the space object.

Another category of position determination is celestial navigation, ranging from the techniques used by ancient sailors to sophisticated modern star trackers. These methods, however, typically require an unobstructed view of one or more celestial bodies, which can preclude operation under cloud cover or during daytime.

Described herein is a platform equipped with a system having detection and ranging capabilities (a "User") that can determine position, attitude, and clock offset from a reference time based on knowledge of a single space object's ephemeris (position and velocity over time) and one or more measurements of the space object's position and velocity relative to the User, hereinafter called the "reverse-ephemeris" method. Any set of measurements that is sufficient to identify the 3-dimensional position and 3-dimensional velocity of the space object should be sufficient to determine 6 independent User parameters, such as three-dimensional position and three attitude angles, or two-dimensional position (latitude and longitude), three attitude angles, and clock offset. One way to make these six measurements, is to measure a) the range to the space object (as determined by the time required for the signal to reach the space object and return to the User), b) the rate of change in the range to the space object (the range-rate, as determined from the Doppler shift in signal frequency), and c) the azimuth and elevation, and rate of change in azimuth and elevation, of the space object as measured from the gimbals used to point the receiver antenna or telescope at the space object. Other methods might be used; for instance, interferometry could be used instead of a gimbaled antenna or telescope to determine one or more angles of arrival of the signal as reflected from the space object.

A method to perform the position, attitude, and time fix is to use a multi-dimensional minimization algorithm to minimize the difference between the measurements and the expected value of the measurements (the "residual") for given input position, attitude, and clock time. Examples of such an algorithm include, but are not limited to, the Newton or Newton-Raphson method, the Gauss-Newton method, and the quasi-Newton methods, such as the Broyden, Fletcher, Goldfarb, and Shanno (BFGS) method. In practice, the minimization algorithm varies a set of six or fewer User parameters to be solved (e.g., latitude, longitude, altitude, yaw or heading, pitch, roll, and/or clock offset) until each of the residuals, or some combination (e.g., the sum of the squares) of the residuals is sufficiently small, or until successive guesses cannot produce any significant decrease in the residual(s).

While several minimization algorithms can be used, the one addressed herein, the bisection method, is used to determine the User position directly from only two of the measurements, the range and range-rate. The bisection method is a one-dimensional algorithm used to solve for a root of a single-valued function of a single variable. The range and range-rate measurements can be used to define a three-dimensional surface in space on which the detection and ranging system must lie. The intersection of these two surfaces is a curve defining all possible positions for the detection and ranging system. If the User is at sea level, the true position is then just the intersection of this curve with the Earth's surface.

Mathematically, the User is assumed to exist on the World Geodetic System of 1984 (WGS-84) reference ellipsoid representing the approximate shape of the Earth. This is the same coordinate reference system as is used by GPS. If the altitude is known (e.g., a ship at sea level), measured, or assumed, the size of the reference ellipsoid can be scaled accordingly. If higher accuracy is needed, the WGS-84 reference can be corrected using the local Earth geoid height datum. The intersection of the reference ellipsoid with the two surfaces defined by the detection and ranging system measurements gives two positions in space. These two positions are usually far apart, and one of the positions can be eliminated either by context (for example, if the User is in the Caribbean and not the Pacific) or from its proximity to a previously known User position. As described earlier, the intersections of these three curves (range, range-rate, and reference ellipsoid) can be determined by multi-dimensional root-finding algorithms. However, here, the problem is simplified into a single-dimensional expression for the User's radial distance from the center of the Earth as a function of the measured range and range-rate. Though there is no known closed-form solution, this expression can be solved using a simple 1-dimensional root-finder. With the radial distance known, the latitude and longitude can then be calculated directly.

This two-dimensional solution for the User's position is independent of the full six-dimensional problem as described previously. Thus, the six-dimensional problem can effectively be reduced to a simpler four-dimensional problem (in our example, to solve for the User's attitude and clock offset using the two measured angles and angle-rates). Again, this four-dimensional minimization problem is not guaranteed to converge, or to converge to the true solution instead of a local function minimum. Additional geometric data may be gleaned from the now-known User position, if the initial guess at ship attitude and clock offset are insufficient to yield a converged solution using a minimization algorithm.

Additional modifications may also be used to refine the results or provide additional data. For instance, if the Radar or Lidar, or other detection and ranging system antenna or telescope is mounted on a floating or gyroscopically-leveled platform, a measurement of the elevation of the space object above the horizon could be used to construct another curve, similar to the constant-range curve, which could be intersected with either the range or range-rate curve. This could provide a check or correction on the initial position fix, or it could be used to resolve the User's actual altitude. Also, if using a leveled platform, a single rotation (about the zenith, or "up" direction) is sufficient to describe the difference between the known space object velocity components and those measured using the range-rate and two angle rates. This provides a method to calculate the heading (from North) of the platform.

Figure 1:
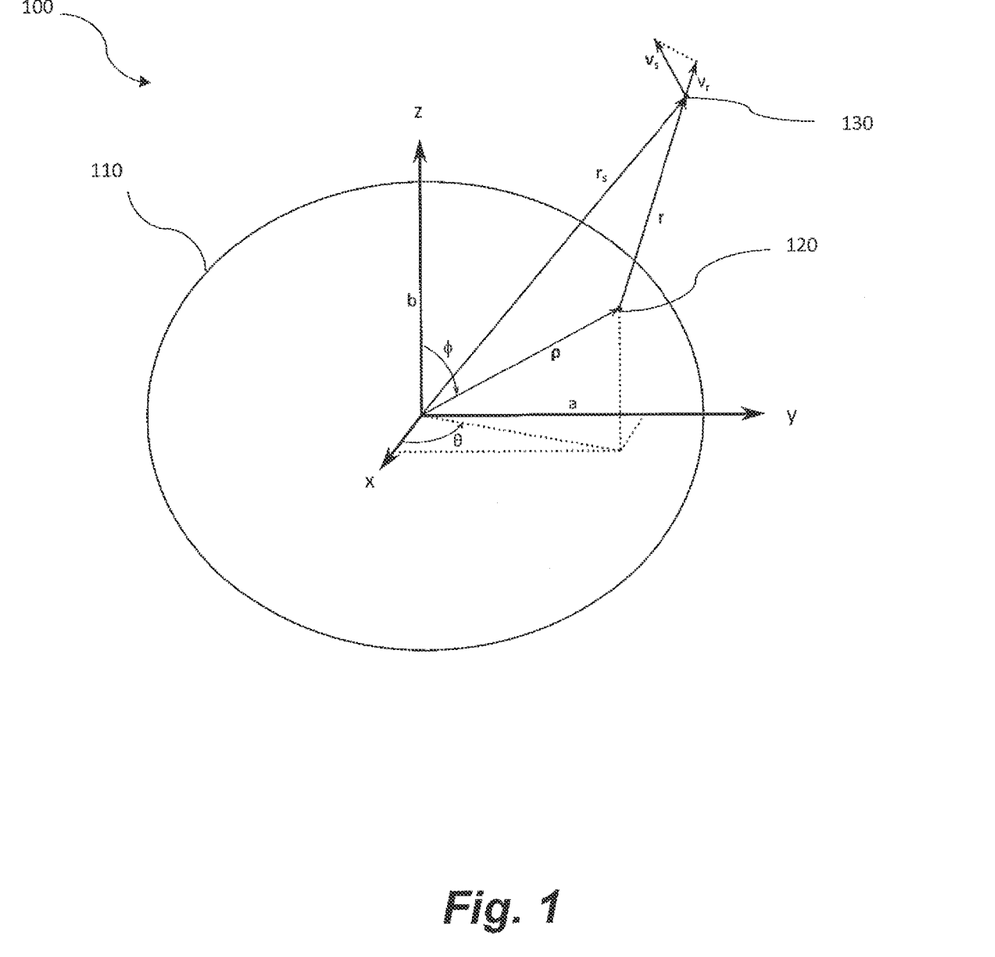
FIG. 1 shows a diagram of a coordinate system having an XYZ axis illustrating reverse-ephemeris problem geometry.

FIG. 1 depicts an embodiment of a system 100 in accordance with Reverse-Ephemeris Method for Determining Position, Attitude, and Time. WGS84 Reference ellipsoid 110 represents the approximate shape of the earth and is centered at the approximate center of mass of the Earth. An example of a coordinate system is the Earth-Centered Earth-Fixed (ECEF) coordinate system, with the z-axis running through the North Pole, x-axis through the equator at the prime meridian, and y-axis to complete the right-handed system. WGS84 reference ellipsoid 110 is bi-axial (symmetric in x and y), such that the ECEF Cartesian coordinates of a point on WGS84 Reference Ellipsoid 110 are given by:

$$\frac{x^2}{a^2} + \frac{y^2}{a^2} + \frac{z^2}{b^2} \qquad (\text{Eq. 1})$$

Here, (a) is the semi-major (equatorial) axis length, and (b) is the semi-minor (polar) axis length. For WGS84 Reference Ellipsoid 110, (a)=6378.137 km and (b)≈6356.752 km. Using the spherical coordinate transformation in (Eq. 2), the equation of WGS84 Reference Ellipsoid 110 is then given in terms of ρ (distance from Earth's center of mass) and φ (col-latitude, as measured from the positive z-axis). The longitude of radar position, θ, does not appear in (Eq. 3) due to symmetry.

$$\rho = \begin{bmatrix} x \\ y \\ z \end{bmatrix} = \begin{bmatrix} \rho \sin\phi \cos\theta \\ \rho \sin\phi \sin\theta \\ \rho \cos\phi \end{bmatrix} \qquad (\text{Eq. 2})$$

-continued $$\rho^2 = \frac{(a)^2(b)^2}{(b)^2 + ((a)^2 - (b)^2)\cos^2\phi} \quad \text{(Eq. 3)}$$

System 100 has a User 120 representing the platform for which the position, orientation, or clock offset is sought. User 120 may be a vehicle or surveyor site and has detection and ranging capability. System 100 also comprises a space object 130 having a known ephemeris and can be naturally-occurring or man-made. Position vector, $r_s$ (Eq. 4), and velocity vector, $v_s$ (Eq. 5), at any instant can be determined from known ephemeris by numerically propagating the latest Two-Line Element (TLE) for the space object from the reference epoch to the current time, and converted to ECEF coordinates. The problem geometry is described below:

$$r_s = \begin{bmatrix} x_s \\ y_s \\ z_s \end{bmatrix} \quad \text{(Eq. 4)}$$

$$v_s = \begin{bmatrix} v_x \\ v_y \\ v_z \end{bmatrix} \quad \text{(Eq. 5)}$$

Measured range r from User 120 to space object 130 defines a sphere on which User 120 lies:

$$r^2 = \|\rho - r_s\|^2 = (x-x_s)^2 + (y-y_s)^2 + (z-z_s)^2 \quad \text{(Eq. 6)}$$

or in spherical coordinates:

$$x_s \sin\phi\cos\theta + y_s \sin\phi\sin\theta + z_s\cos\phi = \frac{r^2 - \rho^2 - r_s^2}{-2\rho} \quad \text{(Eq. 7)}$$

Taking advantage of the problem symmetry, the space object 130 coordinates from the ECEF system can be rotated by angle α such that the x-component of space object 130 position is zero (Eq. 8). The rotation matrix, R, is then given by (Eq. 9), and (Eq. 10) gives the new space object position vector. In FIG. 1, this rotation would force the satellite position vector, $r_s$, onto the y-z plane.

$$\alpha = \tan^{-1}\left(\frac{x_s}{y_s}\right) \quad \text{(Eq. 8)}$$

$$R = \begin{bmatrix} \cos\alpha & -\sin\alpha & 0 \\ \sin\alpha & \cos\alpha & 0 \\ 0 & 0 & 1 \end{bmatrix} \quad \text{(Eq. 9)}$$

$$r_{s,x_s=0} = R r_{s,ECEF} \quad \text{(Eq. 10)}$$

With this rotation, Equation (7) becomes:

$$\sin\theta = \frac{r^2 - \rho^2 - r_s^2 + 2\rho z_s\cos\phi}{-2\rho y_s \sin\phi} \quad \text{(Eq. 11)}$$

Using the definition of the ellipsoid from (1), sin φ and cos φ can be written as:

$$\sin\phi = \pm\frac{a}{\rho}\sqrt{\frac{\rho^2 - b^2}{a^2 - b^2}} \quad \text{(Eq. 12)}$$

$$\cos\phi = \pm\frac{b}{\rho}\sqrt{\frac{a^2 - \rho^2}{a^2 - b^2}} \quad \text{(Eq. 13)}$$

Substituting (Eq. 12) and (Eq. 13) into (Eq. 11) gives an expression for sin θ as a parametric function of ρ. This defines a curve at the intersection of the Earth's surface and the sphere of range, r, from space object 130.

A separate three-dimensional surface can be defined by the measured range-rate, $v_r$. The range rate is simply the projection of the space object velocity vector onto the unit vector pointing from User 120 to the space object 130, as seen in FIG. 1. This can be expressed as:

$$v_r = v_s \cdot \frac{r_s - \rho}{r} \quad \text{(Eq. 14)}$$

or rearranging and expanding in spherical coordinates:

$$v_r r = v_s \cdot r_s - v_s \cdot \rho = v_s \cdot r_s - \rho(v_x \sin\phi\cos\theta + v_y \sin\phi\sin\theta + v_z\cos\phi) \quad \text{(Eq. 15)}$$

Figure 2:
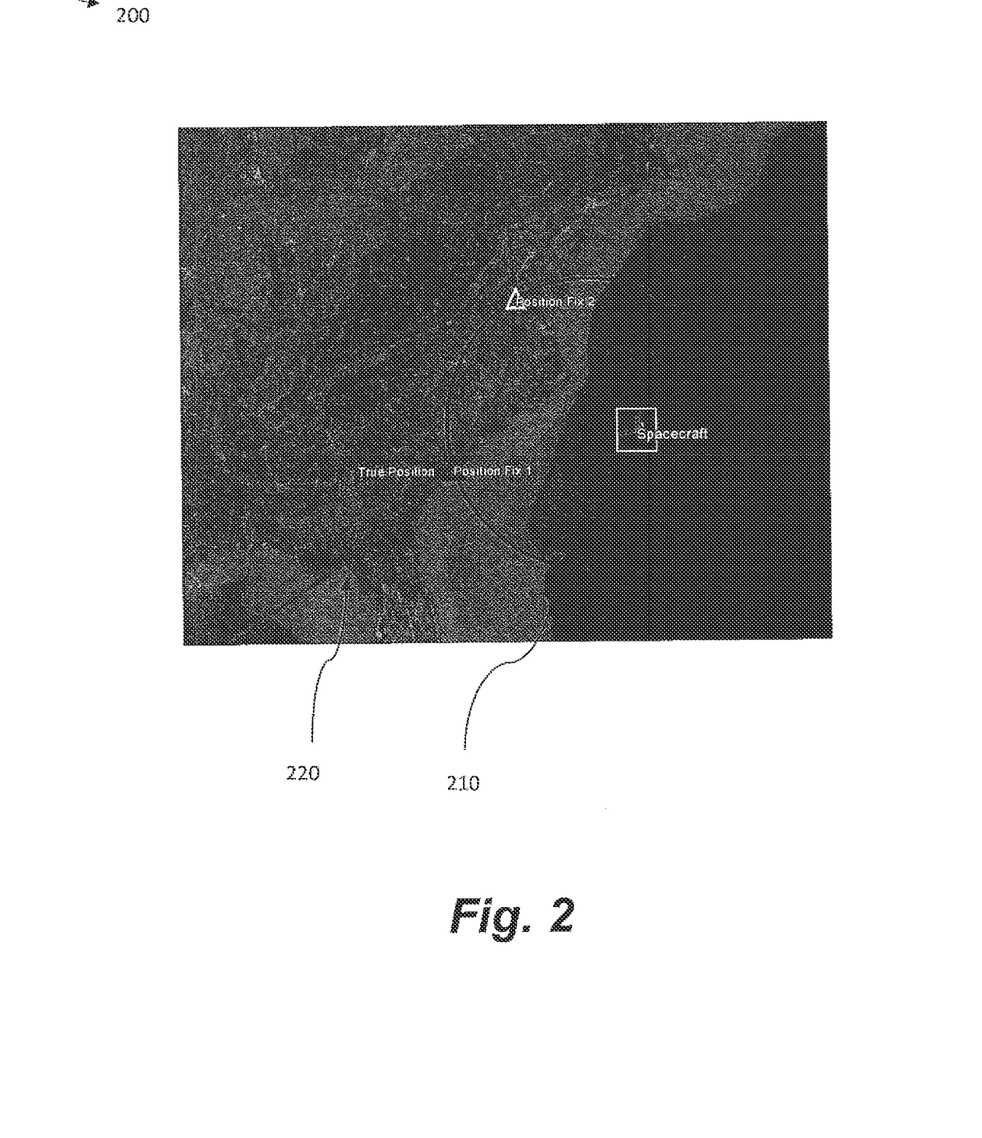
FIG. 2 shows an aerial view of an embodiment of a system in accordance with the reverse-ephemeris method for determining position, attitude, and time.

FIG. 2 shows an aerial view 200 of an embodiment of system 100 using data from space surveillance radar sites. The black curve represents fixed range 210 and the gray curve represents fixed range-rate 220. Since the Earth is very nearly spherical, fixed range 210 is nearly circular. The intersections Position Fix 1 and Position Fix 2 of fixed range 210 and fixed range-rate 220 represent the two possible locations on the surface of the Earth for User 120. The only necessary measurements are space object range, r, and range-rate, $v_r$.

Substituting (Eq. 11), (Eq. 12), and (Eq. 13) into (Eq. 15) gives an expression for ρ in terms of the measured range and range-rate. Here cos θ in (Eq. 15) is related to sin θ in (Eq. 11) by the standard Pythagorean identity, $\sin^2\theta + \cos^2\theta = 1$. It is unclear whether closed-form solutions for ρ in (Eq. 15) exist, so the position fixes must be determined numerically. Each position fix is then rotated back to the reference ECEF coordinate system by left-multiplying by the inverse (or equivalently, the transpose) of the original rotation matrix:

$$\rho_{ECEF} = R^T \rho_{x_s=0} \quad \text{(Eq. 16)}$$

One embodiment would utilize a satellite communications system to perform the same types of measurements of a single space object (e.g., range, range-rate, azimuth, elevation, azimuth-rate, and elevation-rate), and thereby determine position, attitude, and clock offset in the same manner. Some communications satellite systems already take measurements of the range and/or Doppler shift or range-rate to compensate for Doppler, facilitate antenna beam or satellite handover, etc. Even "geostationary" satellites could be used for this purpose, since they are not completely stationary with respect to a point on the Earth, but travel in a small "figure-8" motion.

Some embodiments of the method involve reversing the signal path, i.e., using a radar or lidar/ladar transmission from a space object which can then receive the signal returned after reflecting from the User on or near the Earth. The space object would then perform the necessary calculations based on knowledge of its own position and the signal time delay (range), Doppler shift (range-rate) and/or angles and angle-rates from which the signal arrives at the space object (either measured by the pointing angles of a directional antenna or telescope or by interferometry). Alternatively, the raw signal data or measurements could be transmitted from the satellite to ground station to calculate the position, attitude, and clock time of the User and then retransmit that information (either through the same satellite or by some other means) to the User. Alternatively, the raw signal data or measurements could be transmitted from the satellite directly to the User for the User to perform the necessary calculations. The primary disadvantage to these alternatives is that they will not function if the satellite (or relay satellite or ground station) malfunctions such that it cannot transmit or perform the necessary measurements or calculations.

Figure 3:
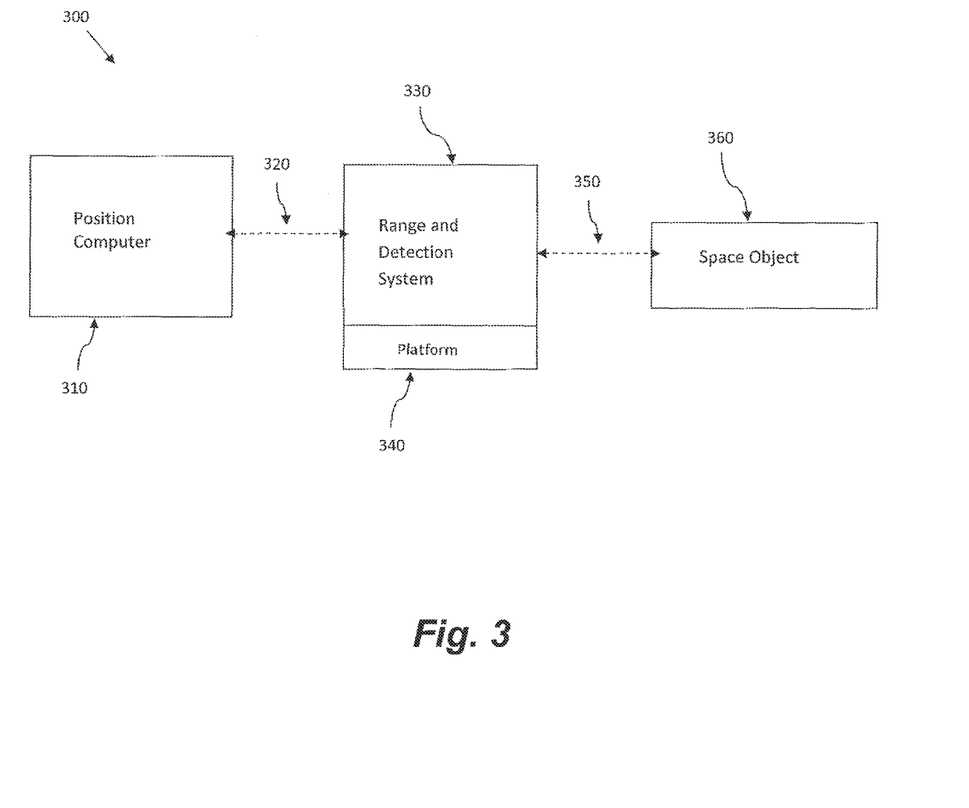
FIG. 3 shows a system illustrating an embodiment of the reverse-ephemeris method for determining position, attitude, and time.

FIG. 3 represents system 300 for determining platform position. System 300 has a positioning computer 310 operably coupled to a detection and ranging system 330. Positioning computer 310 can be set to be activated automatically upon loss of GPS. In another embodiment, a User can simply manually turn on positioning computer 310. Positioning computer 310 sends a command 320 to detection and ranging system 330. Detection and ranging system 330 sits on top of platform 340. Detection and ranging system 330 transmits a signal 350 to space object 360, space object 360 having a known ephemeris. Signal 350 is reflected from space object 360 back to detection and ranging system 330. Detection and ranging system 330 calculates range-to-object and range-rate measurements, and sends those measurements back to positioning computer 310. Position computer 310 then calculates latitude and longitude of platform 340.

Figure 4:
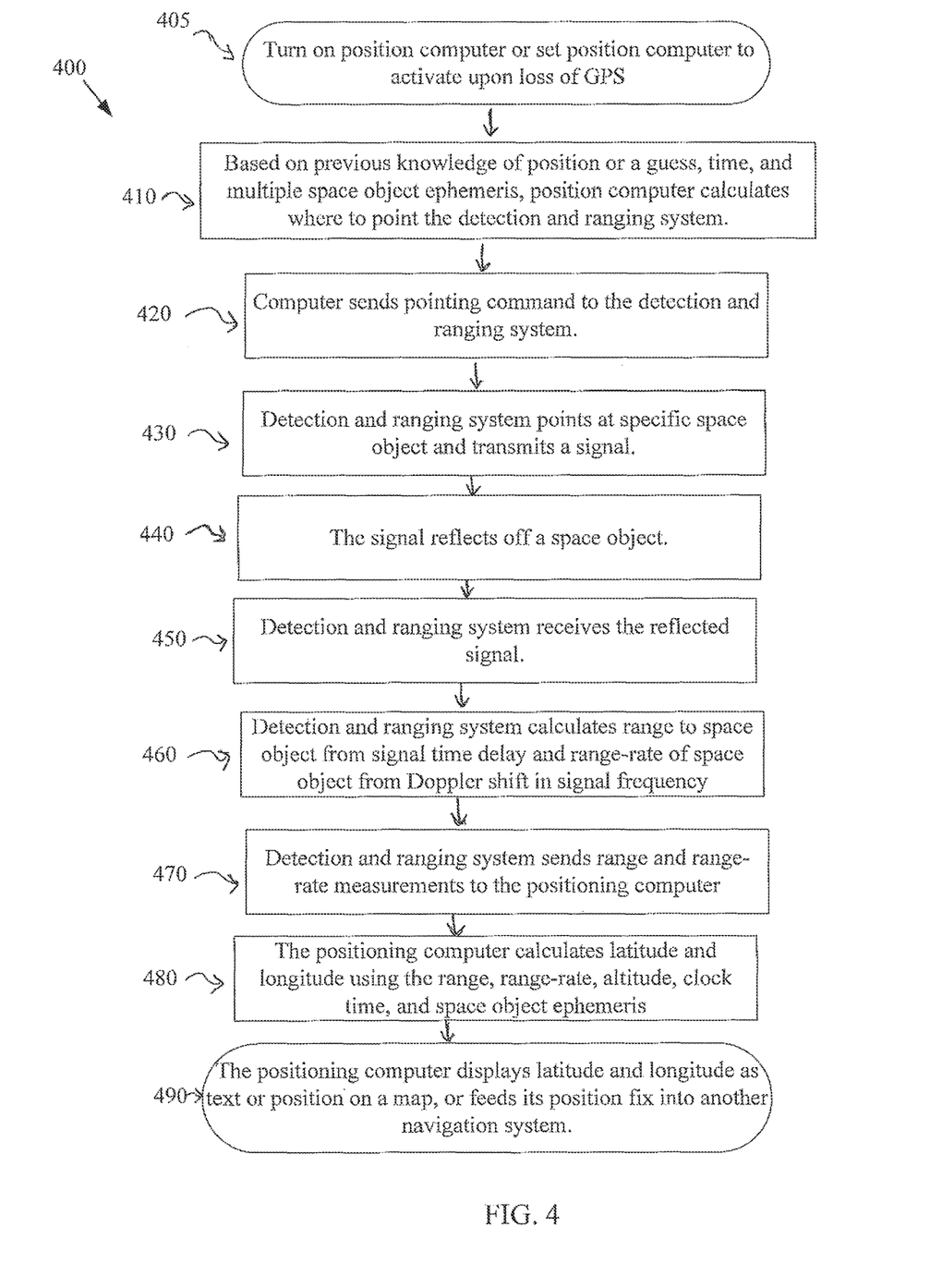
FIG. 4 shows a flow-chart depicting the reverse-ephemeris method for determining position, attitude, and time.

FIG. 4 shows a flowchart of an embodiment of a method 400 in accordance with the Reverse-Ephemeris Method for Determining Position, Attitude, and Time. Method 400 may begin at step 405, which involves turning on a position computer, or, upon loss of GSP, setting a position computer to activate.

Step 410 involves calculating where to point the detection and ranging system based on space object ephemeris, time, and previous knowledge of position. In some embodiments, position may have to be estimated if there is no prior knowledge of specific position.

Step 420 involves the position computer to send a command to the detection and ranging system. Step 430 involves pointing the detection and ranging system at a specific space object based on the command from the position computer, and transmitting a signal to the space object. Step 440 involves the signal from Step 430 reflecting off the space object. Step 450 involves the detection and ranging system receiving the reflected signal from Step 440. Step 460 involves the detection and ranging system calculating measurements including the range-to-space object and the range-rate of the space object. The range-to-space object is calculated from the transmitted and reflected signal time delay. The range-rate is calculated from the Doppler shift in signal frequency from the transmitted and reflected signal.

Step 470 involves the detection and ranging system sending the range and range-rate measurements back to the positioning computer. Step 480 involves the positioning computer calculating the latitude and longitude using the measurements of range, range-rate, altitude, clock time, and space object ephemeris. Step 490 involves the positioning computer displaying latitude and longitude as text or position on a map. In another embodiment, the position fix can be fed into another navigation system.

Some embodiments use a reference object other than a satellite as the known position. This could be an airplane or unmanned aerial vehicle, a balloon, or even a fixed site on land or at sea. One disadvantage is that the field of view of the reference object encompasses much less of the surface of the Earth than the field of view of a space object, so either the User would have to remain nearer (within line-of-sight) to a relatively small number of reference objects, or the system must consist of significantly more reference objects to allow global or large-area coverage. Another disadvantage is that such a system may not have sufficient Doppler shift for the range-rate to be used as one of the measurements if the relative speed of the User and the reference object is not great enough.

Another embodiment would use two or more satellites or other objects in known positions, measured either simultaneously or sequentially. Using four or more objects simultaneously would be analogous to the position and timing method used by GNSS systems, except that the User system is the transmitter and the space object measured would not need to actively transmit any signal. This method could potentially provide more data or a better fix over measuring a single space object. This embodiment may require more than one laser transmitter and optical receiver (for lidar) or more than one antenna and/or transceiver (for radar) to perform the measurements simultaneously. Another disadvantage is that it may require additional signal processing to distinguish the return signals from different space objects.

Another embodiment would transmit signals at two or more frequencies and separately measure the return signal. This would allow for compensation for the ionospheric delay in the signal, which is (predictably) different at different frequencies, as is practiced in some GNSS and communications systems.

Another embodiment incorporates an estimate of the User velocity from other measurement sources as a means to compensate for the User's velocity when using the Doppler shift measurements to determine the range-rate.

Another embodiment would employ the disclosed method as part of a more complex navigation system. Such a system might use additional positioning methods, such as dead reckoning with accelerometers and gyroscopes, GNSS, celestial navigation systems, etc., and combine their position, attitude, velocity, and time estimates with those of this invention, for example using a Kalman filter, or by other means of incorporating multiple sensors and positioning, attitude determination, and timing methods.

Another embodiment uses the reverse-ephemeris methods disclosed herein to determine the position, attitude, and clock time of one User, and then use other means to determine the position, attitude, and clock offset of a second remote User relative to the first User.

Another embodiment could use as the reference space object an active satellite with the means to modulate data onto the reflected radar or lidar signal. This could be any data stored onboard the space object during a previous pass over another User or ground station which needs to be relayed to the User. For one variation on this method, the position fix could be significantly improved in the following manner. During a previous pass, a site with a known location could track the space object and calculate the change to its ephemeris (via least-squares differential correction or other means). That site (or another site) could then transmit the newly calculated space object ephemeris to the space object. The User could then receive that new ephemeris directly from the space object during any of its subsequent passes over the User, since the new ephemeris data could be modulated directly onto the reflected signal from the User. This would significantly reduce the primary source of error, i.e., the error in the space object ephemeris as it is known to the User, since updated space object ephemeris could be sent directly to the User over the same signal the User transmits. Alternatively, the User could receive ephemeris updates from other means, e.g., satellite or terrestrial radio communications, internet access, etc.

Another embodiment uses a fixed site (or a transmitter at a known location or trajectory) to transmit a radar or lidar signal at known times or intervals. The User would then receive some of the energy of the radar or lidar signal reflected from the space object and measure the time delay (compensating for the known time the signal would take from the transmitter to the space object), the Doppler shift/range-rate, and/or the angles and angle-rates to perform the necessary calculations to determine position, attitude, and clock offset. With this embodiment, the User system would not be required to transmit, and could therefore be made smaller and require significantly less power.

Many modifications and variations of the Reverse-Ephemeris Method for Determining Position, Attitude, and Time are possible in light of the above description. Within the scope of the appended claims, the embodiments of the methods and systems described herein may be practiced otherwise than as specifically described. The scope of the claims is not limited to the implementations and the embodiments disclosed herein, but extends to other implementations and embodiments as may be contemplated by those having ordinary skill in the art.

We claim:

1. A method to calculate position of a platform comprising the steps of:
   using a detection and ranging system coupled to the platform to transmit a signal to a space object having a known ephemeris;
   receiving, at the detection and ranging system, a reflected signal from the space object, wherein the reflected signal is the transmitted signal reflected off of the space object;
   determining a range of the platform from the space object using a time delay between transmission of the signal and receipt of the reflected signal;
   determining a range-rate using a Doppler frequency shift between the transmission of the signal and the receipt of the reflected signal;
   calculating a position fix of the platform using the determined range, the determined range-rate, an altitude of the platform, and the known ephemeris of the space object.

2. The method of claim 1, wherein the detection and ranging system is selected from a group consisting of a Radar, Lidar, Ladar, and a Laser Rangefinder.

3. The method of claim 1, wherein the platform is a ship.

4. The method of claim 3, wherein the ship exists on the World Geodetic System of 1984 reference ellipsoid representing the approximate shape of the Earth.

5. The method of claim 1 further comprising the step of calculating an orientation and a clock offset of the platform by using the known space object location and the detection and ranging system as well as two angles to the space object and the rate of change of those angles.

6. The method of claim 5, wherein the two angles to the space object are azimuth from true north and elevation above the horizon.

* * * * *